United States Patent [19]

Schenavar

[11] 4,032,829
[45] June 28, 1977

[54] ROAD SHOCK ENERGY CONVERTER FOR CHARGING VEHICLE BATTERIES

[76] Inventor: Harold E. Schenavar, 18696 Inkster Road, Detroit, Mich. 48240

[22] Filed: Aug. 22, 1975

[21] Appl. No.: 607,032

[52] U.S. Cl. .............................. 320/61; 180/65 R; 290/1 R; 322/4; 322/40
[51] Int. Cl.² .................. B60K 25/10; B60L 11/00
[58] Field of Search ........................ 322/1, 3, 4, 40; 320/61, 2; 180/65 R; 290/1 R

[56] References Cited
UNITED STATES PATENTS

| | | | |
|---|---|---|---|
| 3,507,580 | 4/1970 | Howard et al. ................ | 320/61 UX |
| 3,861,487 | 1/1975 | Gill ................................. | 320/61 X |

FOREIGN PATENTS OR APPLICATIONS

| | | | |
|---|---|---|---|
| 1,332,202 | 10/1973 | United Kingdom ................ | 322/40 |

Primary Examiner—Robert J. Hickey
Attorney, Agent, or Firm—Willis Bugbee

[57] ABSTRACT

Energy, from road bed jolts, expended against the wheels and axle or axle housing of either a self-propelled or a trailer vehicle so as to cause the axle to rise and fall is transmitted to a rotatable shaft through a reciprocatory-to-rotary motion transformer including a elongated double rack housings containing compression springs engaging relatively-sliding shorter double racks which through their delayed actions due to their inertia and the time required for them to compress their respective springs cause the motion of the racks to lag behind the road-shock induced motions of their respective rack housings, whereupon the thus-compressed springs expand and push their respective racks into the end spaces so opened up within their respective housings, whereupon the thus-tardily moving racks belatedly rotate their respective pinions provided with oppositely-acting unidirectional clutches. The consequent intermittent rotation of the shaft is rendered continuous by a flywheel on the shaft. The rotation of the shaft drives an electric current generator, the electric current output from which is fed to storage batteries, either the propulsion batteries of an electric vehicle or auxiliary storage batteries to charge these batteries. Compression springs engaging the ends of the racks in addition to transmitting the road-shock-induced motions of the housings and axle to the clutches and shaft, also cushion the shocks which might otherwise damage the mechanism.

2 Claims, 2 Drawing Figures

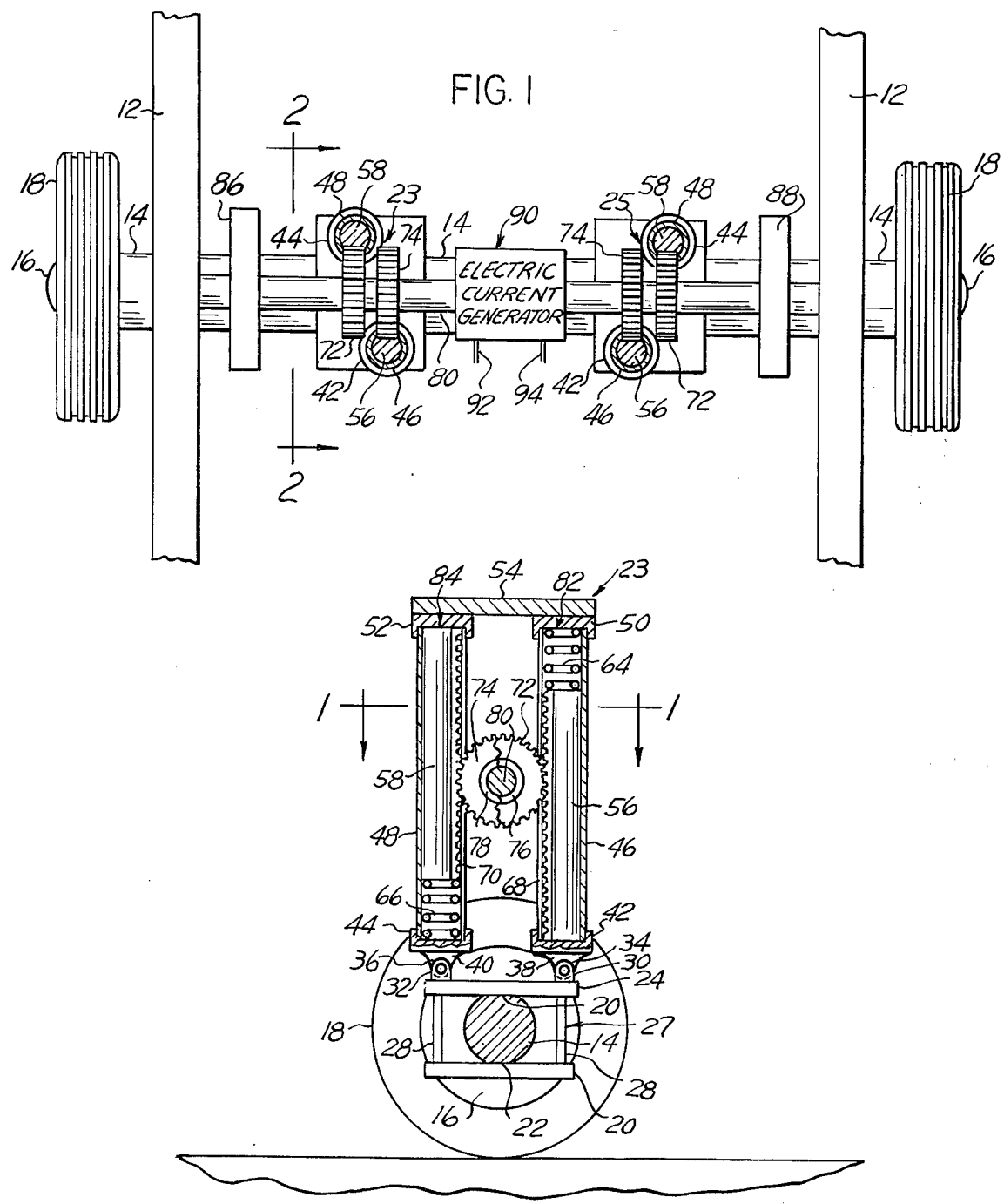

ROAD SHOCK ENERGY CONVERTER FOR CHARGING VEHICLE BATTERIES

SUMMARY OF THE INVENTION

The invention particularly resides in the provision of the oppositely-acting relatively-sliding inertia-operative racks and pinions in a shock-moved axle coupling and longer housings connected thereto causing rotation of the unidirectional clutches connected between a vehicle axle or axle housing and a shaft to rotate the shaft continuously in one direction by the aid of flywheels so as to rotate a shaft which in turn rotates a flywheel and the armature of an electric current generator, the current output from which charges storage batteries, either the electric vehicle propulsion batteries or the auxiliary storage batteries of a nonelectrically-propelled or trailer vehicle.

IN THE DRAWING

FIG. 1 is a diagrammatic top plan view, partly in horizontal section along the line 1—1 in FIG. 2, of the forward portion of a vehicle chassis showing one form of road shock energy converter, according to the present invention, for recharging either the main propulsion batteries of the vehicle or the auxiliary storage batteries of a non-electrically-propelled or trailer vehicle; and FIG. 2 is a vertical cross-section taken along the line 2—2 in FIG. 1, showing the mechanism for converting intermittent vertical reciprocatory motion of the front axle of the vehicle to continuous rotary motion of an electrical generator shaft.

Referring to the drawing in detail, FIG. 1 shows the forward end portion of a vehicle chassis 10 having frame side members 12 which normally support the vehicle body (not shown) and which are connected by conventional springs (not shown) beneath the frame members 12 to the front axle 14 carrying front wheels 16 and tires 18 in the usual manner. The front axle 14 is provided with upper and lower flat portions 20 and 22 (FIG. 2) by which it is operatively connected to a pair of motion-transformers 23 and 25 by an axle coupling 27 consisting of parallel plates 24 and 26 respectively interconnected by tie bolts 28. The upper plate 24 is provided with ears 30 and 32 staggered relatively to one another and connected by pivot pins 34 and 36 to correspondingly-located ears 38 and 40 respectively secured to the lower end caps 42 and 44 of elongated parallel down-drive and up-drive rack housing 46 and 48 respectively. The motion-transformers 23 and 25 are of like construction, but oppositely arranged (FIG. 1).

The elongated rack housings 46 and 48 are offset laterally to one another as shown in FIG. 1, and are closed at their upper ends by upper end caps 50 and 52 respectively interconnected by a bridge plate 54. Reciprocably mounted within the elongated rack having 46 and 48 and freely slidable relatively thereto are shorter down-drive and up-drive racks 56 and 58 respectively. The down-drive rack 56 at its lower end abuts the lower end cap 42 and its upper end engages the lower end of a helical compression rack-stroke-cushioning spring 64, the upper end of which abuts the upper end cap 50. The upper end of the rack 58 abuts the upper end cap 52 whereas its lower end engages the upper end of a helical rack-stroke-cushioning compression spring 66, the lower end of which abuts the lower end cap 44.

The down-drive and up-drive rack housing or cylinders 46 and 48 are provided with longitudinal slots 68 and 70 respectively exposing the teeth of the down-drive and up-drive racks 56 and 58 so that they mesh continuously with down-drive and up-drive pinions 72 and 74 respectively. The pinions 72 and 74 are drivingly connected for unidirectional rotation through conventional overrunning or unidirectional down-drive and up-drive clutches 76 and 78 to a rotary shaft (FIG. 2) journaled in the frame members 12 above the front axle 14 in vertically-spaced parallel relationship. The down-drive rack housing 46, upper spring 64, down-drive rack 56, down-drive pinion 72 and down-drive unidirectional clutch 76 collectively constitute a unidirectional down-drive motion transformer unit 82, whereas the up-drive rack housing 48 up-drive rack 58, up-drive pinion 74 and up-drive unidirectional clutch 78 collectively constitute a unidirection up-drive motion transformer unit 84 of the motion transformers 23 and 25.

The down-drive pinion and unidirectional down-drive clutch 76 in response to the downward motion of the down-drive rack 56 and compression of its spring 64 by the downwardly-moving rack housing 46 impart rotation to the shaft 80 in one direction but upon upward motion of the down-drive rack 56 rotate loosely and freely relatively to the shaft 80, whereas upon upward motion of the up-drive rack 58 and compression of its spring 66 by the upwardly-moving rack housing 48 the up-drive pinion 74 and up-drive clutch 78 impart rotation to the shaft 80 in the same direction of rotation as is imparted thereto by the down-drive unit 82 but rotate loosely and freely relatively to the shaft 80 upon downward motion of the rack 58. The same motions of the racks 56 and 58 and pinions 72 and 74 and clutches 76 and 78 of the motion converter 25 impart similar rotation to the shaft 80 in response to the jolts received as the vehicle 10 moves over the bumps and depressions in the uneven roadbed being travelled.

In order to convert the intermittent impulses of the motion-converters 23 and 25 into steady or continuous rotation of the shaft 80, the latter carries flywheels 86 and 88 respectively drivingly connected to it. The unidirectional clutches or overrunning clutches 76 and 78 are conventional and well known to those ordinarily skilled in the power transmission art, and their details are beyond the scope of the present invention. One such overrunning or unidirectional clutch is known in the mechanical field as the Torrington drawn-cup roller clutch and is sold on the open market.

Power is taken off of the rotary shaft 80 to drive an electrical generator 90 which in turn supplies direct electric current to recharge storage batteries (not shown) which may be either the main propulsion batteries of an electric vehicle 10 or auxiliary storage batteries aboard a non-electrically-propelled or trailer vehicle. For simplicity of disclosure, the generator 90 is shown in FIG. 1 with its armature directly connected to the shaft 80 in coaxial relationship therewith, the direct current generated being delivered through current output cables 92 and 94 to the above-mentioned storage batteries (not shown). It will be understood, however, that for most efficient performance the armature of the generator 90 would ordinarily be drivingly connected to the shaft 80 through gearing or through sprockets and a sprocket chain.

The operation of the invention is believed to be apparent from the foregoing description of its construction. As the vehicle 10 is driven over an uneven roadbed, the consequent rise and fall of the tires 18, wheels 16 and front axle 14 resulting from the jolts received from the roadbed irregularities cause a consequent rise and fall of the axle coupling 27, of the rack housings 46 and 48 of the motion transformers 23 and 25 which, in turn, compressed springs 64 and 66 while the rack bars 56 and 58 remain momentarily stationary due in part to the time lag introduced by the time of compression of the springs 64 and 66 and in part by the time lag introduced by the inertia of the rack bars 56 and 58 according to Newton's First Law of Motion. This opens up a temporary gap at the bottom of the housing 46 and at the top of the housing 48 into which the adjacent ends of the racks 56 and 58 move when they overcome their respective inertias, consequently rotating their respective pinions 74 and 72. These impart rotation to the shaft 80 during both the rise and fall through the pinions 72 and 74 and undirectional clutches 76 and 78. The intermittent impulses imparted to the axle 14 by the irregular occurrence of the bumps and depressions in the roadbed are smoothed out by the flywheels 86 and 88. The result is a continuous rotation of the shaft 80 during travel, resulting in a consequently continuous drive imparted to the electric generator 90 with a consequently steady flow of direct electric currrent therefrom through the current output conductors or cables 92 and 94 to the storage batteries either aboard the same vehicle or aboard a trailer vehicle coupled thereto. Thus, the present invention enables the normal maximum length of travel of an electrically-propelled vehicle without recharging of its main batteries to be considerably lengthened, in proportion to the roughness of the road bed. While the invention has been illustrated and described in connection with the front axle 14 of the vehicle 10, it will be evident that motion-conversion units similar to the units 23 and 25 can be operatively connected to the rear axle of the vehicle and employed in a similar manner to continuously recharge the above-mentioned main propulsion or auxiliary storage batteries during travel over uneven roadbeds.

I claim:

1. A road shock energy converter for charging storage batteries aboard a vehicle having a chassis with axles carrying ground wheels, said converter comprising an axle coupling adapted to be secured to one of the axles,
a horizontal rotatable shaft adapted to be journalled in the vehicle chassis,
a first upstanding reciprocatory-to-rotary motion transformer including an elongated rack housing operatively connected to said coupling, a rack shorter than said rack housing slidably mounted therein for reciprocation relatively thereto, a pinion meshing with said rack, a unidirectional clutch drivingly connecting said pinion to said shaft whereby said motion transformer is responsive to the intermittent and irregular rectilinear thrusts received thereby from pavement irregularities by way of said axle coupling to impart correspondingly intermittent and irregular and unidirectional torque thrusts to said shaft;
said shaft being operatively connected to driven relationship to said clutch,
a flywheel drivingly connected to said shaft for rotation unitarily therewith and thereby smoothing out the effects of said itermittent and irregular torque thrusts upon said shaft and consequently rendering more nearly regular and continuous the rotation of said shaft,
and an electric current generator drivingly connected to said shaft and having current output conductors adapted to be electrically connected in recharging relationship to storage batteries of the same or accompanying vehicle.

2. A road shock energy converter, according to claim 1, wherein a rack-stroke-cushioning spring is mounted in said housing between one end of said rack and the adjacent end of said housing in power-transmitting relationship therebetween.

* * * * *